United States Patent [19]

Veronesi

[11] Patent Number: 5,165,305
[45] Date of Patent: Nov. 24, 1992

[54] HERMETICALLY SEALED FLYWHEEL AND METHOD OF MAKING THE SAME

[75] Inventor: Luciano Veronesi, O'Hara Township, Allegheny County, Pa.

[73] Assignee: Westinghouse Electric Corp., Pittsburgh, Pa.

[21] Appl. No.: 625,580

[22] Filed: Dec. 11, 1990

[51] Int. Cl.$^5$ ............................................. F04B 39/00
[52] U.S. Cl. ................................. 74/574; 219/78.01; 219/117.1; 219/162; 228/165; 228/170
[58] Field of Search ............... 74/572, 574; 219/78.01, 219/117.1, 162; 228/165, 170

[56] References Cited

U.S. PATENT DOCUMENTS

| | | | |
|---|---|---|---|
| 3,450,056 | 6/1969 | Heathcote et al. | 310/360 |
| 3,475,631 | 10/1969 | Stark et al. | 310/360 |
| 4,084,924 | 4/1978 | Ivanoff et al. | 417/424 |
| 4,596,522 | 6/1986 | Onoda | 228/165 X |
| 4,886,430 | 12/1989 | Veronesi et al. | 417/423.13 |
| 5,058,453 | 10/1991 | Graham et al. | 74/574 |

*Primary Examiner*—Leslie A. Braun
*Assistant Examiner*—William O. Trousdell

[57] ABSTRACT

A flywheel assembly adapted to act also as a high inertia journal bearing in a canned pump or the like is composed of an annular core of heavy metal material which is hermetically sealed in a stainless steel casing formed by a number of enclosure pieces welded together along circumferential weld edges. The weld edges are specially configured by mating weld canopies provided on the respective pieces which minimize the potential for damage to the annular core during welding, and which act to minimize stress concentrations due to the welds and thermal expansion of the casing. An outer cylindrical shell of the casing is heat shrunk onto the outer core and grooves are provided in the outer surface of the annular core to axially secure the outer enclosure member to the core, and to ensure that thermal expansion of the cylindrical shell occurs substantially equally in each axial direction of the shell. The flywheel assembly includes radial and axial bearing surfaces provided on the outer casing. The casing configuration protects the heavy annular core, which may include depleted uranium, from oxidation and a reliable hermetic seal is insured by the welded edge configuration.

43 Claims, 6 Drawing Sheets

5,165,305

HERMETICALLY SEALED FLYWHEEL AND METHOD OF MAKING THE SAME

BACKGROUND OF THE INVENTION

The present invention relates to a hermetically sealed flywheel for use in a canned motor pump or a like application. The present invention also relates to a method of manufacturing such a flywheel, which insures the integrity of the flywheel assembly notwithstanding the adverse conditions of its use.

Centrifugal pumps having flywheels are well known, the flywheel being incorporated to mechanically store potential energy during operation of the pump in order to maintain rotation of the pump in the event of loss of electric power. The flywheel is generally a metal disk having a relatively high mass and being precisely attached to or mounted on the motor shaft for rotation therewith, the inertia of which keeps the shaft rotating for some period of time after de-energization of the motor. In nuclear reactors, such flywheels are used to maintain coolant circulation through the reactor core after the coolant pumps are shut off pursuant to a reactor "trip", since the nuclear fuel continues to give off substantial amounts of heat after such a shutoff and since the resulting protraction of pump shaft rotation prolongs the circulation of coolant through the core.

Pressurized water reactor (PWR) coolant pumps generally include a pump and motor which are separated by a complicated shaft seal system, the seal being used as a part of the reactor coolant system pressure boundary. The seals are subject to about a 2,500 psi pressure differential between the reactor coolant system and the containment atmosphere. There is a possibility that these seals may fail, and cause a non-isolable leak of primary coolant ranging in size from very small to fairly large. Such a leak can result in damage to the pump and other equipment, and can necessitate a costly clean-up operation.

Canned pumps have been used in nuclear reactor plants for some time to obviate the need for such a shaft seal arrangement since the entire pump, including bearings and rotor, are submerged in the pump fluid. Therefore, the use of a canned pump reduces the potential for a loss of coolant accident (referred to in the art as a "LOCA"). Exemplary canned motor pumps are described in U.S. Pat. Nos. 3,450,056 and 3,475,631. In pressurized water reactors, continued rotation of these pumps upon loss of electric power is provided by electro-mechanical means, generally in the form of motor-generator sets having flywheels incorporated therein. The motor-generator set is generally located outside of the reactor containment for accessibility purposes, the electricity being transmitted from the generator to the pump motor through containment wall penetrations. In the event of a loss of electric power to the motor-generator set, the flywheel maintains rotation of the generator for some period of time, which continues to provide power to the motor pump. However, due to the lack of mechanical inertia in the pump itself, any localized failure of the pump or its controls may prevent the pump from extended coast-down. In addition, due to the necessity for extra equipment, this option is fairly expensive both in capital cost and in operation and maintenance costs.

A flywheel within a canned or wet winding pump has been utilized. However, the fluid friction losses resulting from spinning a large, high mass flywheel through the fluid contained in the pump casing are substantial. The outer surfaces of the flywheel attempt to frictionally pump the surrounding fluid, while the casing surrounding the flywheel inhibits fluid flow. Therefore, turbulent vortices form that cause highly distorted fluid velocities which in turn applies substantial drag on the flywheel. This drag is a function of the speed and area of the surface of the flywheel, both of which increase with the radius of the flywheel, such drag being commonly understood to increase with about the fifth power of the diameter and about the cube of the angular velocity.

One arrangement to reduce flywheel drag is disclosed in U.S. Pat. No. 4,084,924 to Ivanoff et al. This patent describes a canned pump having a flywheel and a free-wheeling shroud rotatable relative to the shaft and the flywheel. The shroud encompasses the flywheel but is spaced apart therefrom and includes passages for ingress and egress of liquid into and out of the space between the flywheel and the shroud. The disclosure envisions that the shroud will rotate at some angular velocity between zero and the velocity of the flywheel, thereby creating two pumped fluid layers, one (between the flywheel and the shroud) being pumped by the flywheel, and the other (the layer outside the shroud) being pumped by the shroud. The lower relative angular velocity between the rotating surfaces therefore results in lower total drag.

U.S. Pat. No. 4,886,430, issued Dec. 12, 1989 to the present inventor (as a co-inventor) describes a canned pump having a high inertia flywheel immersed along with the rotor in the pumped fluid (e.g., reactor coolant water), wherein the drag losses associated with the flywheel spinning in the pumped fluid are minimized by surrounding the flywheel with bearing means, such that the flywheel serves also as a high inertia journal bearing. The entire contents of U.S. Pat. No. 4,886,430 is hereby incorporated by reference. The flywheels used in such applications should have as high an inertia as possible while having dimensions as small as possible to reduce drag. In order to accomplish these conflicting objectives, it is desirable to manufacture the flywheel from a metal of high specific gravity. Expense limits the use of gold, palladium and tungsten. Additionally, tungsten is brittle. And, while spent (depleted) uranium is a highly dense material that is relatively inexpensive, it will corrode readily when exposed to moisture. While it is proposed in the just mentioned patent to hermetically seal such a uranium ring in a "can" of non-corrosive metal, thus far no such sealing structure has been developed which is 100% reliable in maintaining the integrity of the seal during periods of prolonged rigorous use of the flywheel, e.g., as a journal bearing in a canned motor pump. The stresses associated with such rigorous use may cause weld seams to break, as may the thermal differential expansion between the uranium ring and the "can" of non-corrosive metal. Thus, there is a need for a flywheel that is as dense as spent uranium but which is not subject to corrosion.

SUMMARY OF THE INVENTION

It is, therefore, an object of the present invention to provide a structure and method of manufacture for a hermetically sealed flywheel suitable for use in a canned motor pump and like applications, wherein the integrity of the hermetic seal is maintained notwithstanding the severe conditions to which the flywheel is subjected in use, e.g., as a high inertia journal bearing in a canned motor pump.

More specifically, it is an object of the present invention to provide an assembly of enclosure pieces which can be welded together to encapsulate a heavy annular metal core, and a configuration of weld edges which is particularly adapted to reduce stress concentrations due to the weld joints themselves as well as thermal expansions and contractions of the enclosure pieces in operation.

It is a further object of the present invention to provide a means for securing the annular core of metal material within a hermetically sealed casing which can facilitate heat transfer from the casing to the annular core and withstand differential thermal expansions of the casing and the annular core.

These and other objects are achieved by the present invention which, in one aspect, provides a flywheel for a rotating shaft, comprising an annular core formed from a heavy, corrodible metal, and a casing means hermetically sealing the annular core formed from a plurality of metallic members weldably joined together along their edges, wherein the edges of said members include means for relieving stresses generated as a result of said weld joints and thermal expansions of the metallic members.

In another aspect of the invention, the flywheel comprises an annular core of metal and casing means hermetically sealing the annular core, wherein the casing means comprises means for attachment to a rotating shaft and at least one circumferential welded edge, each welded edge comprising mating weld canopies provided therealong, each weld canopy comprising an elastic semi-circular lip which, when mated with a corresponding weld canopy, forms a circumferential channel of substantially circular cross-section, whereby stress concentrations along the welded edge are minimized.

In a further aspect of the invention, the casing means comprises an inner enclosure member having a hollow cylindrical portion which extends through the core and an annular plate portion covering an axial end of the core, the core being heat shrunk onto the cylindrical portion; an outer enclosure member comprising a cylindrical shell heat shrunk onto the core and weldably secured to the annular plate portion; and an annular plate member covering a second axial end of the core and being weldably secured to the cylindrical portion and the outer enclosure member.

In another aspect of the invention, at least one groove is provided in a central portion of an outer circumferential surface of the annular core for axially securing the outer enclosure member to the core upon heat shrinkage and ensuring that thermal expansion of the cylindrical shell occurs substantially equally in each axial direction of the shell.

Other aspects of the invention relate to methods for manufacturing a flywheel assembly of the type described above.

These and other objects and features of the invention will become readily apparent from the following detailed description of the preferred embodiment of the invention, taken in connection with the appended drawings.

DETAILED DESCRIPTION OF THE PREFERRED EMBODIMENT

Figure 1:
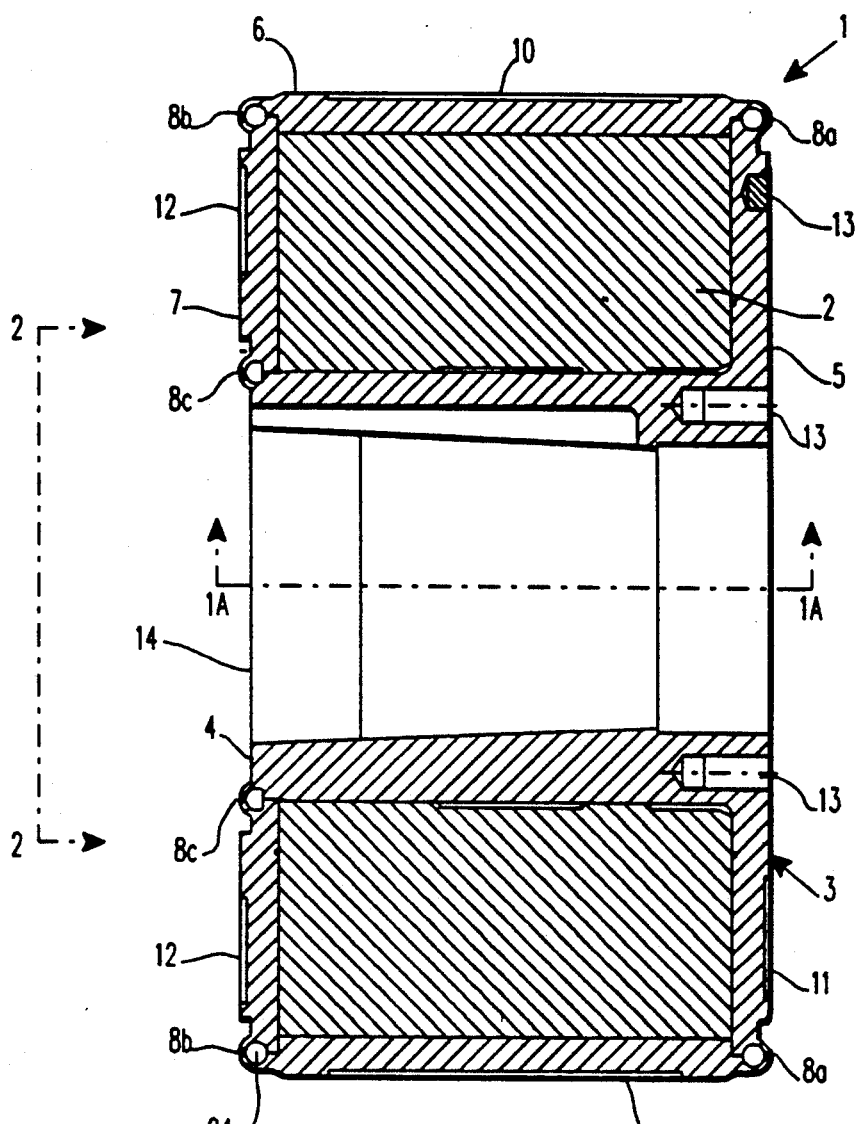
FIG. 1 is a cross-sectional view of the inventive flywheel assembly after final machining and prior to welding.

FIG. 1 illustrates in cross-section a flywheel assembly in accordance with the present invention. The assembly comprises a welded casing 1 surrounding an annularly shaped heavy metal core 2. Casing 1 comprises an inner enclosure member 3 provided with a hollow cylindrical portion 4 extending through annular core 2 and an annular plate portion 5 covering one axial end of core 2. Casing 1 further includes an outer enclosure member 6 having a cylindrical shell and an annular plate member 7 covering the axial end of core 2 opposite annular plate portion 5. Each of the parts of casing 1 is preferably made of stainless steel. This material is suitable because of its structural strength, ease of welding and resistance to corrosion. Casing 1 comprises circumferential weld joints 8a–c. Weld joints 8a–c and the process for welding will be described in further detail below.

Figure 1A:
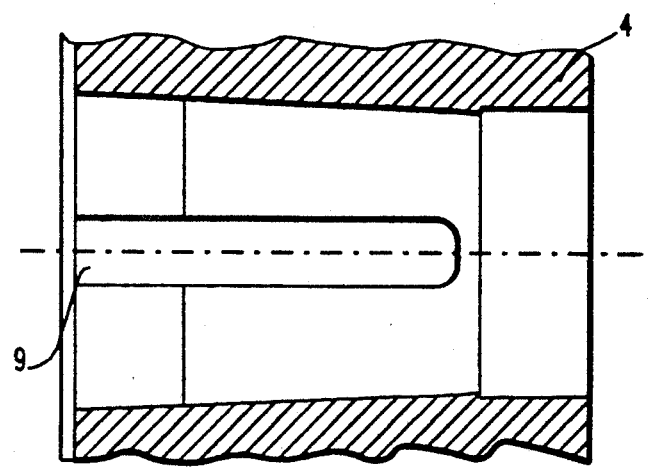
FIG. 1A is a partial view taken along line A—A in FIG. 1, illustrating a keyway provided on the flywheel for attachment to a rotating shaft.

A keyway 9 is machined in hollow cylindrical portion 4. This keyway comprises an open-ended slot as shown in FIG. 1A and is adapted to engage with a spline provided on a rotating shaft such as the motor shaft of a canned motor pump. In the embodiment shown (wherein the flywheel acts as a high inertia journal bearing) outer enclosure 6 includes a radial bearing surface 10 of hard material such as stellite. Similarly, an annular thrust bearing surface 11 is provided on the annular plate portion 5 and a thrust bearing surface 12 is provided on annular plate member 7.

A suitable number of holes 13 is provided in inner enclosure member 3, both adjacent to shaft passage 14 and adjacent the outer circumferential edge of casing 1, for lifting the flywheel assembly and for removing the flywheel from the shaft. Holes 13 are threaded such that lifting hooks or the like can be screwed into the holes.

Figure 2:
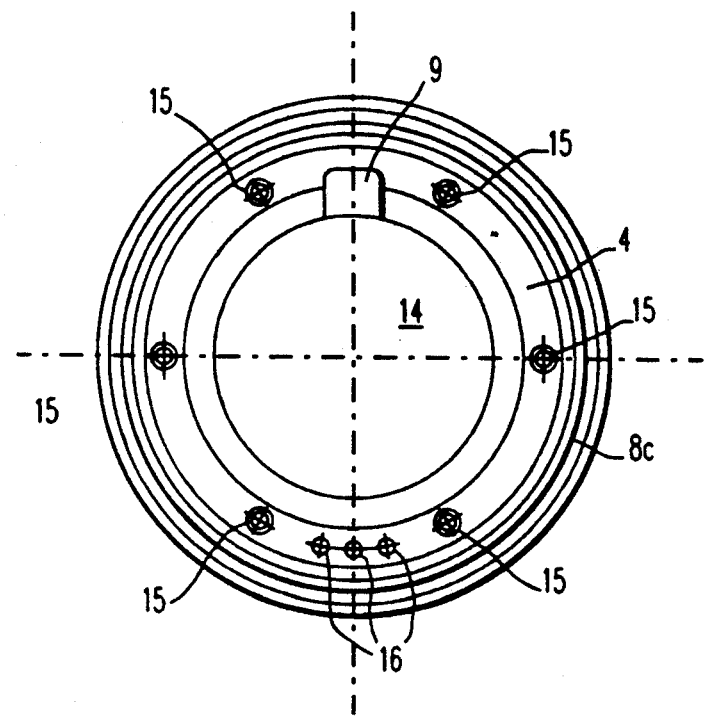
FIG. 2 is a frontal view along line B—B in FIG. 1 illustrating various features of the flywheel including the keyway, fluid flow passages and balancing holes.

In the frontal view of FIG. 2, it can be seen that keyway 9 has a generally rectangular shape. It can also be seen that hollow cylindrical portion 4 is provided with six equally spaced passages 15 which extend the entire axial length of cylindrical portion 4 (see FIG. 4). Passages 15 are provided to allow cooled fluid from a heat exchanger of the canned pump to flow around and cool the flywheel wheel assembly. Each flow channel 15 preferably includes a radially extending end portion 15a (see FIG. 4) for directing coolant flow outwardly away from shaft passage 14. The end portions 15a tend to centrifugally pump the fluid to increase coolant flow and to overcome friction losses.

Also seen in FIG. 2 are balancing holes 16. Holes 16 are drilled or otherwise machined in order to remove material in order to dynamically balance the flywheel assembly. The balancing holes 16 illustrated in FIG. 2 are provided to compensate for the material removed in machining keyslot 9. Additional balancing holes can be provided as necessary to balance the entire assembly.

Figure 3:
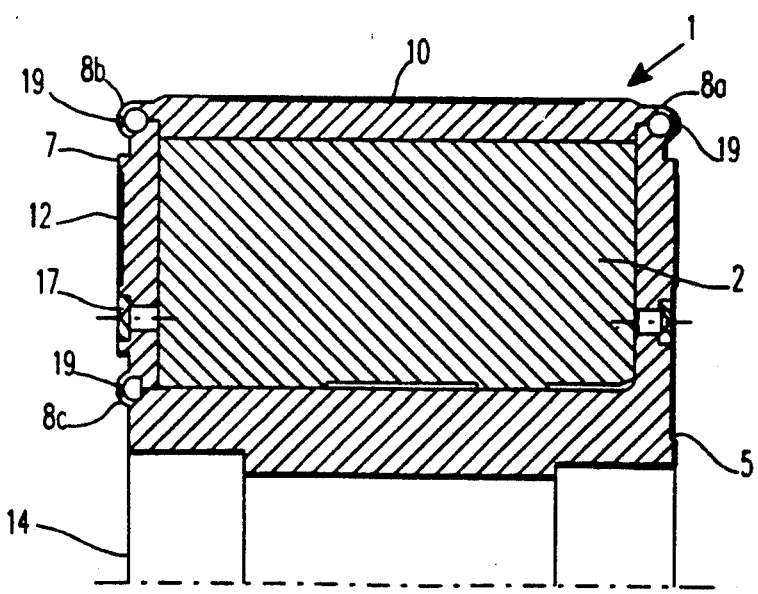
FIG. 3 is a partial cross-sectional view of the flywheel after welding.

FIG. 3 illustrates a cross-section of the flywheel assembly, wherein through holes 17 and 18, provided in annular plate member 7 and annular plate portion 5, respectively, are visible. As shown, the holes are filled with weld material. Prior to welding these holes shut, they are used to inject inert gas such as argon into the assembly during the welding of edges 8a-c. They are also used to inject helium gas under pressure for leak-testing of the welds. FIG. 3 also depicts weld material 19 deposited at each of circumferential welded edges 8a-c. The welding process is subsequently described in detail.

FIGS. 4-8 illustrate separately the components of the flywheel assembly.

Figure 4:
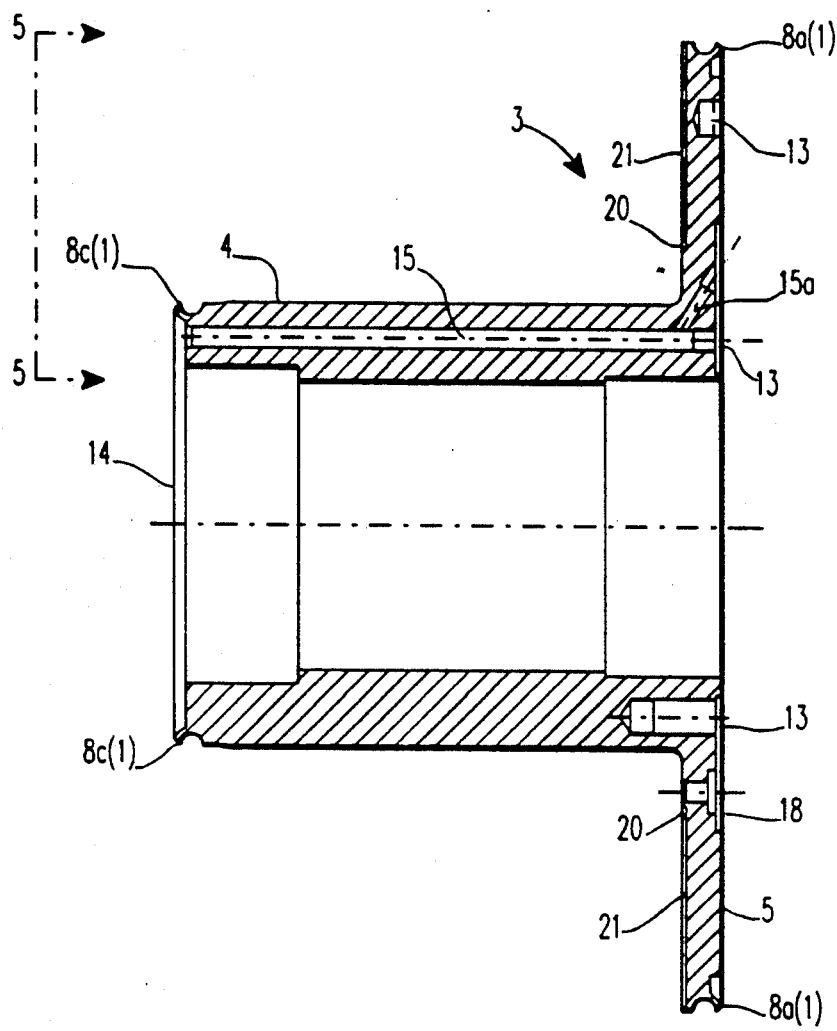
FIG. 4 is a cross-sectional view of an inner enclosure member of the casing which hermetically seals the annular core.

FIG. 4 depicts the inner enclosure member 3 comprising hollow cylindrical portion 4 and annular plate portion 5. In the preferred embodiment, annular plate portion 5 is formed integral with hollow cylindrical portion 4 such as by casting or forging. Alternatively, annular plate portion 5 could be welded to cylindrical portion 4, as is annular plate member 7 in the preferred embodiment.

Figure 5:
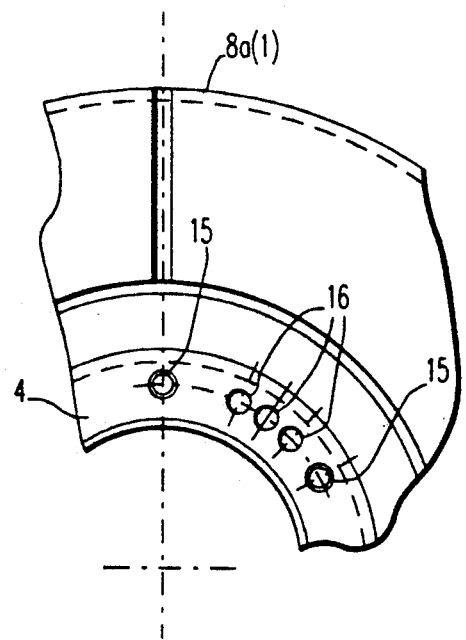
FIG. 5 is a partial frontal view along line C—C in FIG. 4.

As seen most clearly in FIG. 5, the inner side of annular plate portion 5 is provided with a circumferential groove 20 and a plurality of radial grooves 21 for providing a flow of inert gas to weld edge 8a. It can be seen in FIG. 4 that passage 18 is aligned with grooves 20 and 21 to provide a series of channels supplying inert gas to weld edge 8a.

FIG. 5 additionally illustrates, similar to FIG. 2, balancing holes 16 and liquid flow channels 15 in the hollow cylindrical portion 4.

Figure 8:
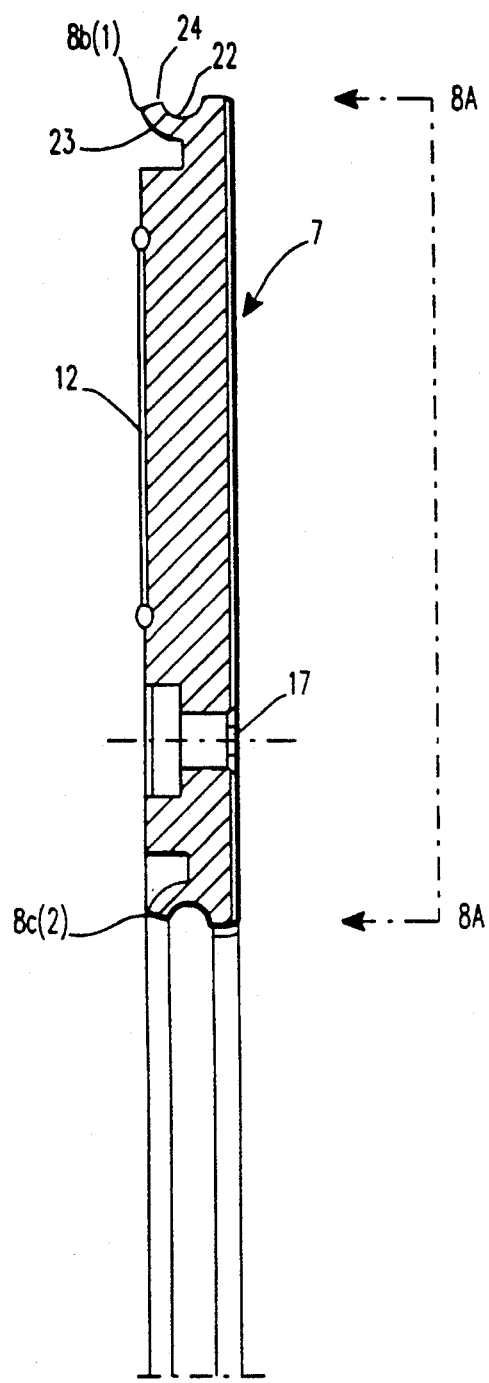
FIG. 8 is a cross-sectional view of an annular plate member which covers an axial end of the annular core.
Figure 8A:
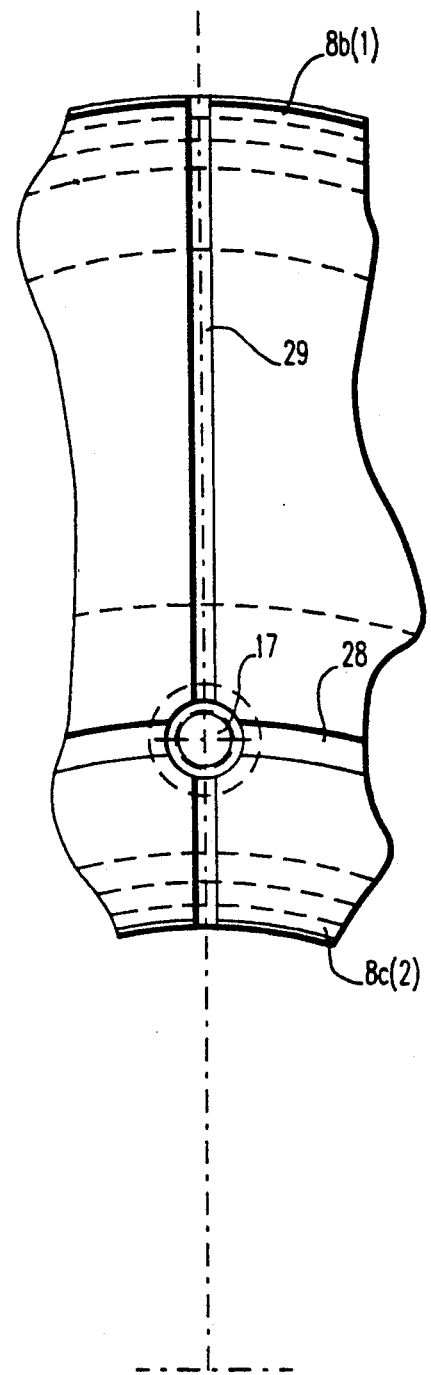
FIG. 8A is a partial frontal view of the annular plate member of FIG. 8.

Inner enclosure member 3 comprises two circumferential edges 8a(1) and 8c(1) adapted to mate with corresponding edges 8a(2) on outer enclosure member 6 (see FIG. 7) and 8c(2) on annular plate member 7 (see FIG. 8). The weld edges on each of enclosure parts 4, 5, 6 and 7 are specially configured in order to avoid stress concentrations at the edges. In operation, the flywheel assembly will undergo repeated heating and cooling. Thermal expansions of each of the casing parts could potentially create excessive stresses at the weld edges leading to destruction of the hermetic seal. Additionally, stress concentrations are potentially created during the welding process itself which may result in deformation of the flywheel assembly.

There is also a serious concern about the amount of heat created during welding and the likelihood of burning through the stainless steel and into the core 2 of depleted uranium. Thus, it is desirable to weld only a small area on each of the edges as opposed to a standard weld requiring a more intense heat throughout the entire corner region.

To avoid the above-stated normal deficiencies which are incurred in standard welding, the edges of the parts forming the assembly, where the parts fit together, are machined with a gutter 22 (See FIG. 8 illustrating both inner and outer edges 8b(1) and 8c(2) of annular plate member 7 which are exemplary of remaining edges 8a(1) and 8c(1) on the inner enclosure member 3 (FIG. 4) and edges 8a(2) and 8b(2) on outer enclosure member 6 (FIG. 7).) By machining a gutter along the circumferential mating edges of the enclosure pieces, a weld canopy 23 comprising an elastic semicircular lip is formed which, when mated with a corresponding weld canopy, forms a circumferential channel 24 of substantially circular cross-section as seen in FIGS. 1 and 3.

The purpose of the special weld joint configuration is two-fold. First, when corresponding weld canopies 23 on the respective enclosure parts are mated, beveled end surfaces 24 of the mated weld canopies form a triangular weld groove for receiving a small amount of weld material. This configuration allows a strong weld while requiring only a small weld area along the edges. The likelihood of burning through the stainless steel and into the uranium core during the welding operation is minimized since, in contrast to standard welding, less heat is generated along the edges. Furthermore, as the welding operation draws metal from the casing in, the spring-like canopy 23 lets out material slack such that stresses created by the weld are avoided. The end result is that the welding of the edges and resultant shrinkage of molten metal will not pull the enclosure and distort the flywheel assembly.

Also, welded edges 8a-c function to relieve stresses which would otherwise occur due to thermal expansion of the enclosure pieces. In the preferred embodiment, the flywheel doubles as a high-inertia journal bearing with bearing surfaces 10, 11 and 12. As an example, when the flywheel is used as part of a canned pump, upon starting the pump, there are frictional losses generated by the bearing. As soon as the pump is started, 100 hp of friction will be dissipated into the metal flywheel assembly and the water. Most of this heat will be dissipated into the metal and as a result the metal will expand. Weld edges 8a-c must therefore be capable of elastically absorbing the expansion or the hermetic seal of the stainless steel casing will be broken due to the thermally induced stresses.

The inventive flywheel assembly overcomes an additional difficulty which arises due to the heat which is dissipated into the flywheel from bearing surfaces 10, 11 and 12 in operation. Namely, stainless steel casing 1 will heat up much faster than uranium core 2. There is typically a thermal expansion lag of more than 45 minutes between stainless steel casing 1 and uranium core 2. Since both outer enclosure 6 and core 2 will transmit torque, it is necessary to fixedly secure outer enclosure 6 to annular core 2. The fixed connection must be maintained notwithstanding the aforementioned differential thermal expansion. To accomplish this, the outer enclosure 6 is shrunk-fit over annular core 2. If the outer enclosure 6 was not shrunk onto core 2, the thermal expansion deviation between the stainless steel shell and uranium core would cause the bond to become loose. On the other hand, by heat-shrinking outer enclosure 6 onto core 2, when heat is dissipated into the assembly 1, differential thermal expansion of the core and outer enclosure 6 is compensated for in a radial direction by the shrinkage.

Expansion in an axial direction of outer enclosure 6 relative to core 2 will be absorbed by the weld canopies 23 provided at edges 8a–b. However, a problem can arise in that a thermal expansion of the outer enclosure may occur disproportionately in a single direction, thereby causing excess deformation at one of welded edges 8a or 8b. The concern is that, absent some special provision, one does not know where the annular core 2 will bite into the outer enclosure radially during the heat shrinkage, due to imperfections in the diameters of the two pieces. A feature of the present invention which alleviates this concern is now described with reference to FIGS. 6 and 6a.

Figure 6:
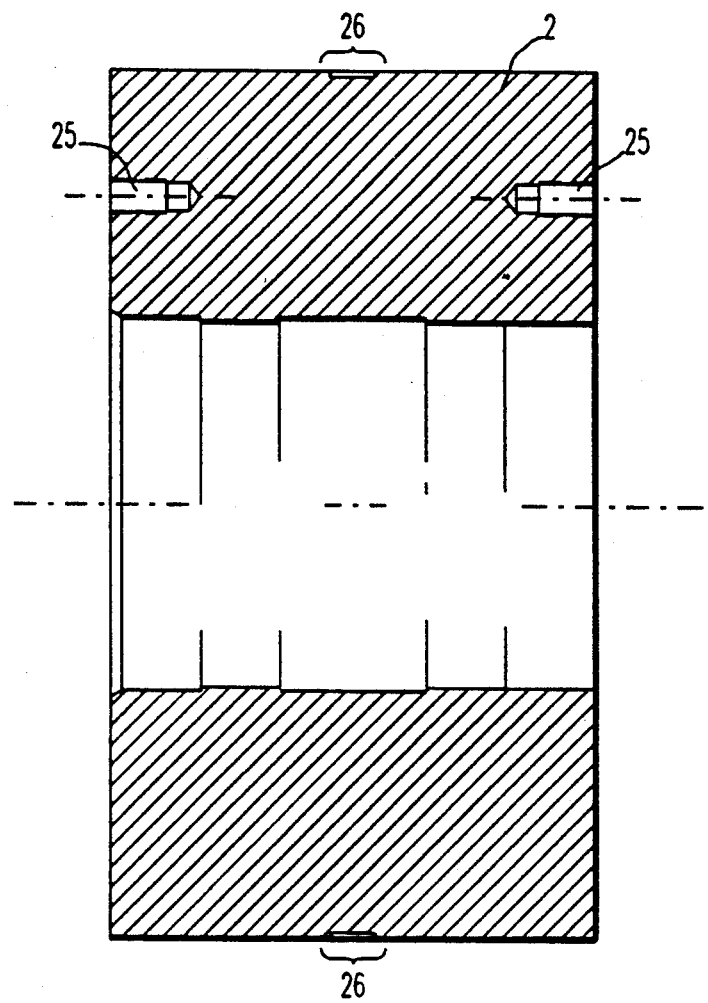
FIG. 6 is a cross-sectional view of an annular metal core in accordance with the invention.
Figure 6A:
FIG. 6A is a partial sectional view depicting grooves provided in the outer surface of the annular core shown in FIG. 6.
Figure 7:
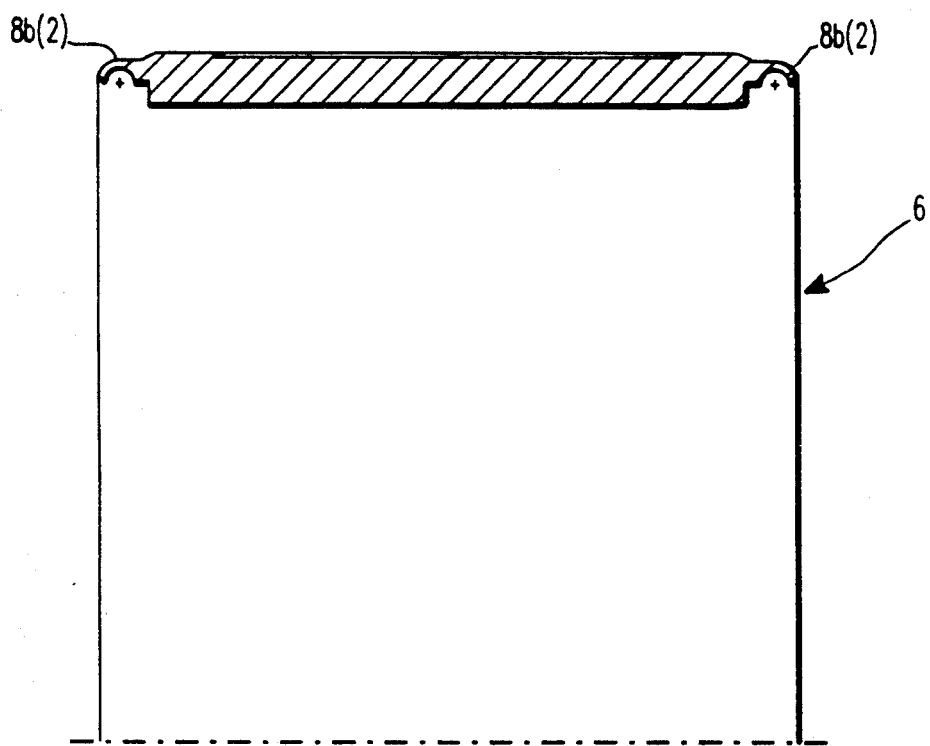
FIG. 7 is a partial cross-sectional view of an outer enclosure member which surrounds the annular core.

FIG. 6 is a cross-sectional view of annular core 2. Threaded holes 25 are provided to facilitate lifting of the annular core 2. A central portion 26 of the outer surface of annular core 2 is provided with a plurality of grooves 27, as shown in FIG. 6a. In the preferred embodiment, five grooves are provided in the uranium core. Each groove is 10-15 mils deep and has sharp corners on the outside, with a small radius on the inside. The grooves may be put on the stock which will machined off at a later point. These grooves help lock the uranium core 2 in place in relation to outer enclosure member 6. Additionally, the grooves are used to ensure that core 2 is locked to outer enclosure member 6 at an axial midpoint to assure that thermal expansion of the outer enclosure 6 takes place equally in both directions. By locking core 2 in place in this manner, the welded edges 8a, b can give elastically with uniform expansions.

In the preferred embodiment, the flywheel assembly has a 28-inch outside diameter, an axial length of 16 and ½ inches, and an interior diameter of approximately 7 inches. The flywheel is secured to a rotating shaft with an interference fit by heat shrinking. Namely, the flywheel is baked and the shaft is frozen during the assembly process. The assembly and welding operations used to manufacture flywheel assembly 1 are now described in detail.

In assembling the various components of the flywheel assembly, annular core 2 is first heat shrunk onto cylindrical portion 4 of inner enclosure member 3. A major concern is the intense stresses that the assembly will encounter. Therefore, there is a need to avoid stress concentrations and to this end, the uranium core 2 does not have a key slot or key way. Rather, it is a perfect cylinder that has been shrunk over cylindrical portion 4. Thus, the stresses induced to fix core 2 to cylindrical portion 4 are transmitted through shrinkage rather than mechanical means and stress concentrations are thereby avoided. Then, outer enclosure 6 is heat shrunk onto annular core 2 as described above and in such a manner that a weld canopy 23 provided on outer enclosure 6 and annular plate portion 5 of the outer enclosure member mate to form edge 8a. Finally, annular plate member 7 is fitted snugly against the exposed axial end of core 2 to form weld edges 8b and 8c. Next, the assembly is welded together.

A preferred method and tool for heat shrinking outer enclosure 6 onto the annular core 2 is now described. Prior to heating outer enclosure 6, the outer enclosure 6 is secured within an annular framelike tool formed by two mating semi-circularly shaped channel members, e.g., of carbon steel. Clamping means such as a threaded hole and bolt arrangement secure the channel members together with a space remaining between the members at each end portion. The channel members are sized to conform closely to the outer circumferential surface of the outer enclosure member and preferably are wide enough to cover substantially all of the outer circumferential surface between weld canopies 8b(2) and 8a(2).

Each channel member is provided with a centrally located groove which extends around the inner periphery of the tool. An air inlet hole is provided at a midpoint along the length of each channel member in communication with the groove. When the tool is mounted on outer enclosure 6, the grooves form passageways leading from the air inlets to the spaces remaining between the end portions of the channel members. During the shrinking operation, pressurized cold air is injected into the grooves via the air inlets and allowed to flow along the central peripheral portion of the outer enclosure in registry with grooves 27 provided in the outer surface of annular core 2. This technique ensures that outer enclosure 6 locks onto core 2 at an axial midpoint, which is important for reasons previously described. The frame serves the additional purposes of imparting structural stability to the relatively flimsy outer enclosure 6 during the heat shrinking operation and providing more thermal inertia to ensure that the outer enclosure does not cool excessively before being placed on core 2.

In the welding process, argon gas is injected into the assembly and directed toward the welded edges. Namely, argon gas is injected through hole 18 provided in annular plate portion 5 and a similar hole 28 provided in annular plate member 7 (See FIGS. 3, 4 and 8). Hole 18 communicates with circumferential groove 20 and a plurality of radial grooves 21 (see FIG. 5) so as to supply argon gas to edge 8a during the welding operation. Similarly, hole 17 in annular plate member 7 communicates with a circumferential groove 28 and a plurality of radial grooves 29 to supply argon gas to edges 8b, c during the welding operation. During welding, all the weld canopies will have been immersed in inert gas, and all oxygen will have been purged from the casing. The final assembly will thus be void of oxygen which could oxidize the depleted uranium.

To ensure that all of the corner welds are solid and thus that the casing has provided a hermetic seal, helium is pumped through holes 17, 18 (see FIG. 3) and the casing is tested for leakage. Pure helium is an ideal gas for testing due to its small molecular structure.

Preferably, final machining of the inner surface of hollow cylindrical portion 4 to create keyway 9 and the tapered profile shown in FIG. 1 is reserved as a final step. This ensures that the desired dimensions will not be changed due to the welding and heat shrinking operations.

It will be apparent that many modifications and variations are possible in light of the above teachings. Therefore, it is to be understood that within the scope of the appended claims, the invention may be practiced other than as specifically described herein.

What is claimed is:

1. A flywheel for a rotating shaft, comprising:
   an annular core formed from a heavy corrodible metal, and
   casing means hermetically sealing said annular core formed from a plurality of metallic members weldably joined together, along their edges, wherein the edges of said members include means for relieving stresses generated as a result of said weld joints and thermal expansion of said metallic members, said stress relieving means including a resilient flange disposed along at least one edge of a metallic member forming said casing means for yieldably deforming when a weld joint is created between said metallic members, and elastically deforming for absorbing thermal expansions.

2. A flywheel according to claim 1, wherein said casing means includes an inner enclosure member, and wherein said annular core is affixed around said inner enclosure member by heat shrinkage in order to avoid localized areas of stress between said core and said inner enclosure member.

3. A flywheel according to claim 1, wherein said casing means includes an outer enclosure member which is secured around the outer periphery of the annular core by heat shrinkage to affix said outer member around said periphery, and to facilitate heat transfer between said outer member and said annular core.

4. A flywheel according to claim 3, further including means for interlocking said outer enclosure member and said periphery of the annular core.

5. A flywheel according to claim 4, wherein said interlocking means includes a plurality of grooves around the periphery of the annular core that bite into the inner surface of the outer enclosure member when said outer enclosure member is heat shrunk around the periphery of said annular core.

6. A flywheel for a rotating shaft, comprising an annular core of metal and casing means hermetically sealing said annular core, said casing means comprising means for attachment to a rotating shaft and at least one circumferential welded edge,
each welded edge comprising mating weld canopies provided therealong, each weld canopy comprising an elastic semicircular lip which, when mated with a corresponding weld canopy, forms a circumferential channel of substantially circular cross-section, whereby stress concentrations along the welded edge are minimized.

7. A flywheel according to claim 6, wherein:
(a) said casing means comprises:
an inner enclosure member having a hollow cylindrical portion which extends through said core and an annular plate portion covering an axial end of said core, said core being fixedly secured on said cylindrical portion;
an outer enclosure member comprising a cylindrical shell fixedly secured to said core; and
an annular plate member covering a second axial end of said core; and
(b) said at least one welded edge comprises:
a first welded edge sealably attaching a first inner edge of said outer enclosure member to an outer edge of said annular plate member;
a second welded edge sealably attaching an inner edge of said annular plate member to an outer edge of said cylindrical portion; and
a third welded edge sealably attaching an outer edge of said annular plate member to a second inner edge of said outer enclosure.

8. A flywheel according to claim 7, wherein said core is heat shrunk onto said cylindrical portion and said cylindrical shell is heat shrunk onto said core.

9. A flywheel according to claim 6, wherein said casing means is stainless steel.

10. A flywheel according to claim 7, wherein said inner enclosure member, said outer enclosure member and said annular plate member are stainless steel.

11. A flywheel according to claim 7, wherein each of the welded edges comprises a thin weld bead provided between tip end portions of said mating weld canopies.

12. A flywheel according to claim 11, wherein said tip end portions are angled to provide a triangular weld groove for receiving weld material.

13. A flywheel according to claim 8, wherein at least one groove is provided in a central portion of an outer circumferential surface of the annular core for axially securing the outer enclosure member to the core upon heat shrinkage and ensuring that thermal expansion of the cylindrical shell occurs substantially equally in each axial direction of the shell.

14. A flywheel according to claim 13, wherein said at least one groove has sharp outer corners, and inner corners with small radii of curvature.

15. A flywheel according to claim 14, wherein said at least one groove is 10 to 15 mils deep.

16. A flywheel according to claim 15, wherein five grooves are provided equally spaced from each other, and said central portion is centered along the axial length of the annular core and spaced inwardly from opposite ends thereof.

17. A flywheel according to claim 7, wherein an outer surface of said outer enclosure member comprises a radial bearing surface and outer surfaces of said annular plate portion and said annular plate member, respectively, comprise thrust bearing surfaces.

18. A flywheel according to claim 6, wherein the metal of said annular core includes depleted uranium.

19. A flywheel for a rotating shaft, having:
an annular core of metal including depleted uranium and casing means hermetically sealing said annular core, said casing means comprising:
means for attachment to a rotating shaft;
an inner enclosure member having a hollow cylindrical portion which extends through said core and an annular plate portion covering an axial end of said core, said core being heat shrunk onto said cylindrical portion;
an outer enclosure member comprising cylindrical shell heat shrunk onto said core and weldably secured to said annular plate portion; and
an annular plate member covering a second axial end of said core and being weldably secured to said cylindrical portion and said outer enclosure member.

20. A flywheel according to claim 19, wherein said casing means is stainless steel.

21. A flywheel according to claim 19, wherein said inner enclosure member, said outer enclosure member and said annular plate member are stainless steel.

22. A flywheel according to claim 19, wherein a first inner edge of said outer enclosure member is welded to said annular plate member along an entire outer circumferential edge thereof, an inner circumferential edge of said annular plate member is welded along its entire extent to an outer circumferential edge of said cylindrical portion, and an outer circumferential edge of said annular plate portion is welded along its entire extent to a second inner edge of said outer enclosure, to thereby hermetically seal the casing means.

23. A flywheel according to claim 22, wherein each of the welded edges comprise mating weld canopies provided therealong, each weld canopy comprising an elastic semicircular lip which, when mated with a corresponding weld canopy, forms a circumferential channel substantially circular cross-section, whereby stress concentrations along the welded edges are minimized.

24. A flywheel according to claim 23, wherein each of the welded edges comprises a thin weld bead provided between tip end portions of said mating weld canopies.

25. A flywheel according to claim 24, wherein said tip end portions are angled to provide a triangular weld groove for receiving weld material.

26. A flywheel according to claim 19, wherein at least one groove is provided in a central portion of an outer circumferential surface of the annular core for axially securing the outer enclosure member to the core upon heat shrinkage and ensuring that thermal expansion of the cylindrical shell occurs substantially equally in each axial direction of the shell.

27. A flywheel according to claim 26, wherein said at least one groove has sharp outer corners, and inner corners with small radii of curvature.

28. A flywheel according to claim 27, wherein said at least one groove is 10 to 15 mils deep.

29. A flywheel according to claim 28, wherein five grooves are provided equally spaced from each other, and said central portion is centered along the axial length of the annular core and spaced inwardly from opposite ends thereof.

30. A flywheel according to claim 19, wherein an outer surface of said outer enclosure member comprises a radial bearing surface and outer surfaces of said annular plate portion and said annular plate member, respectively, comprise thrust bearing surfaces.

31. A method of making a flywheel comprising a hermetically sealed annular metal core with means for attachment to a rotating shaft, comprising the steps of:
 (a) providing an annular metal core;
 (b) forming a plurality of enclosure pieces which can be assembled and welded together along edges thereof to form a hermetic seal around said annular core;
 (c) providing on each circumferential edge of said plurality of enclosure pieces to be welded, a weld canopy comprising an elastic semicircular lip which, when mated with a corresponding weld canopy another enclosure piece, forms a circumferential channel of substantially circular cross-section;
 d) assembling said enclosure pieces around said annular core such that the weld canopies, provided on the enclosure pieces are mated with each other; and
 e) welding together said enclosure pieces along said mating weld canopies, whereby stress concentrations along the welded edges are minimized.

32. A method according to claim 31, wherein:
said enclosure pieces comprise an inner enclosure member having a hollow cylindrical portion and an annular plate portion, an outer enclosure member comprising a cylindrical shell, and an annular plate member; and
said assembly step comprises:
 a) fixedly securing said annular core on said inner enclosure member such that said hollow cylindrical portion extends through said core and said annular plate portion covers a first axial end of said annular core;
 (b) fixedly securing said outer enclosure member to said annular core member so as to cover an outer circumferential surface of said annular core member and such that a weld canopy provided on a first circumferential edge of said cylindrical shell mates with a weld canopy provided along an outer circumferential edge of said annular plate portion; and
 (c) engaging said annular plate member with a second axial end of said annular core such that a weld canopy along a second circumferential edge of said cylindrical shell mates with a weld canopy provided along an outer circumferential edge of said annular plate member, and a weld canopy provided along an outer circumferential edge of said cylindrical portion is mated with a weld canopy provided along an inner circumferential edge of said annular plate member.

33. A method according to claim 32, wherein said welding step is performed by providing a thin weld bead between tip end portions of said mating weld canopies.

34. A method according to claim 33, wherein said tip end portions are angled to provide a triangular weld groove for receiving weld material.

35. A method according to claim 32, wherein said annular core comprises depleted uranium.

36. A method according to claim 32, wherein said annular core is secured to said inner enclosure member by heat shrinking the annular core onto said cylindrical portion.

37. A method according to claim 32, wherein said outer enclosure member is secured to said annular core by heat shrinking.

38. A method according to claim 37, further comprising the step of providing on a central portion of the outer circumferential surface of the annular core at least one groove for axially securing the outer enclosure member to the core upon heat shrinkage and ensuring that thermal expansion of the cylindrical shell occurs substantially equally in each axial direction of the shell.

39. A method according to claim 38, wherein said at least one groove has sharp outer corners, and inner corners with small radii of curvature.

40. A method according to claim 39, wherein said at least one groove is 10 to 15 mils deep.

41. A method according to claim 40, wherein five grooves are provided equally spaced from each other, and said central portion is centered along the axial length of the annular core and spaced inwardly from opposite ends thereof.

42. A method according to claim 32, further comprising the step of providing a radial bearing surface on an outer surface of said outer enclosure member and thrust bearing surfaces on respective outer surfaces of said annular plate portion and said annular plate member.

43. A method according to claim 38, wherein said heat shrinking includes the step of supplying pressurized cooling air to said central portion for causing the shell to lock onto said core at the central portion.

* * * * *